Inventor
R. W. Neyman
Cameron, Kerkam & Sutton
Attorneys.

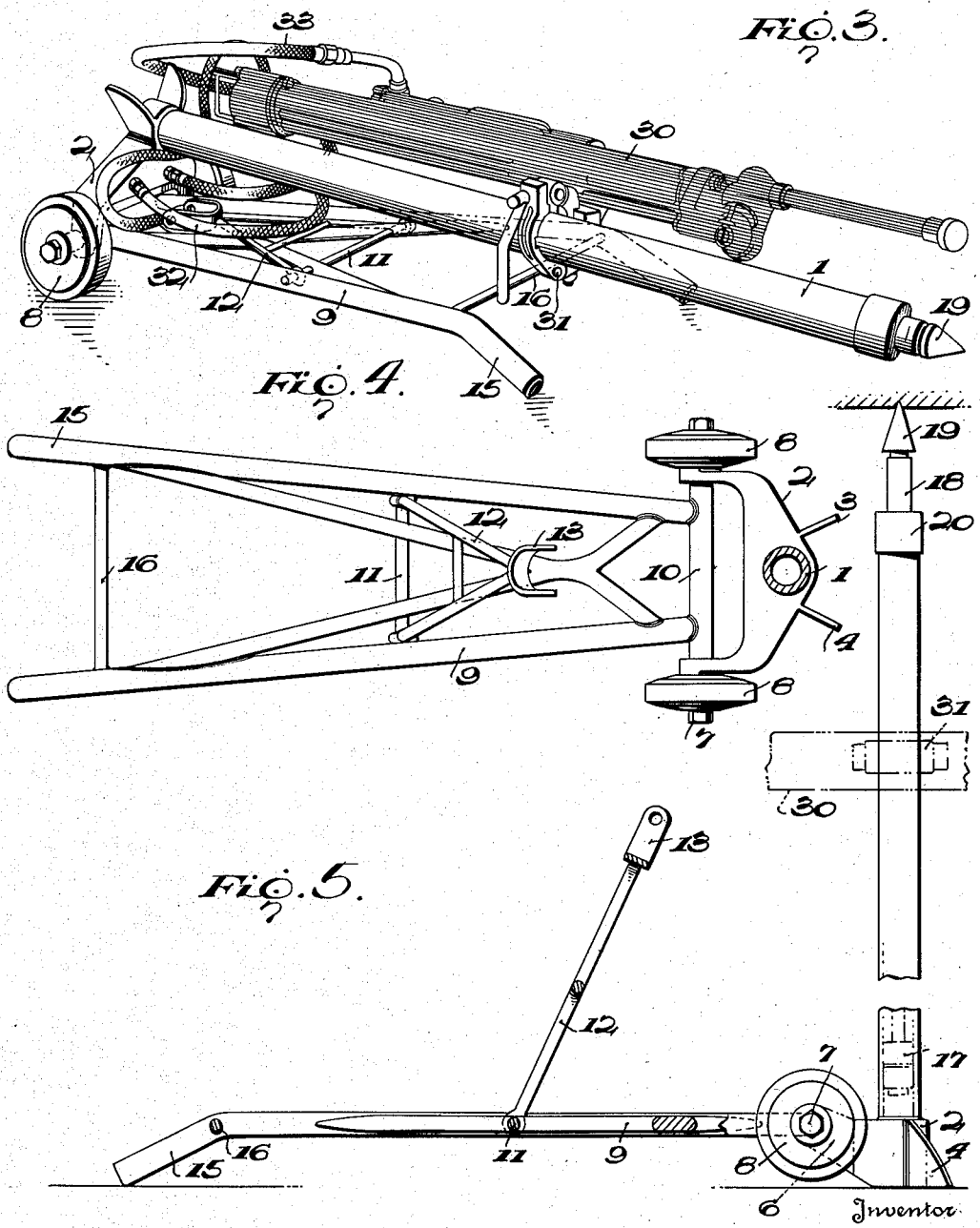

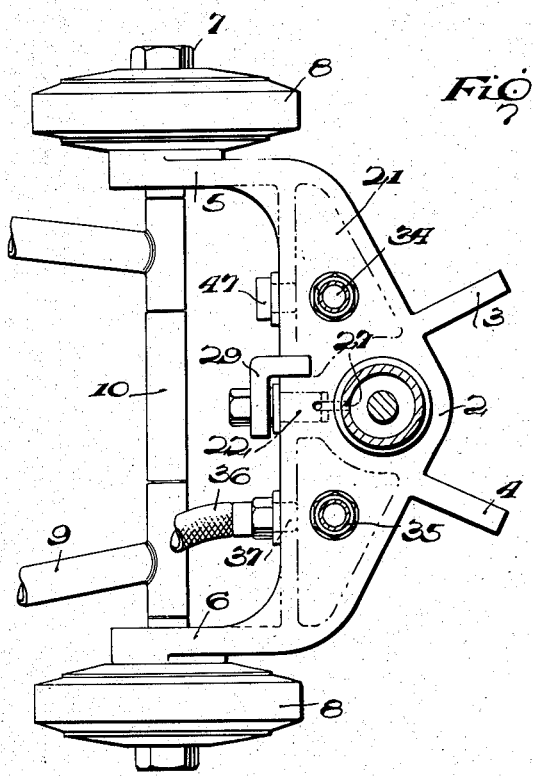
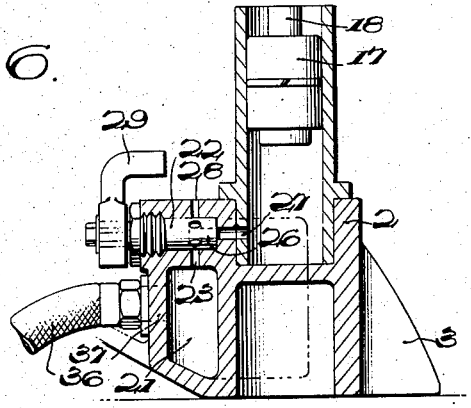
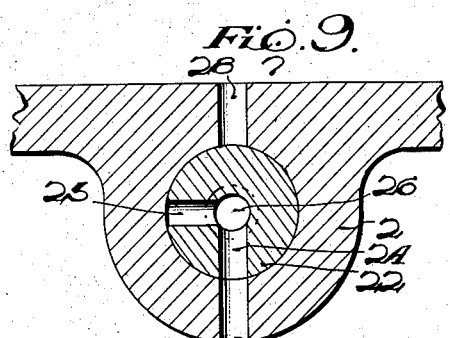
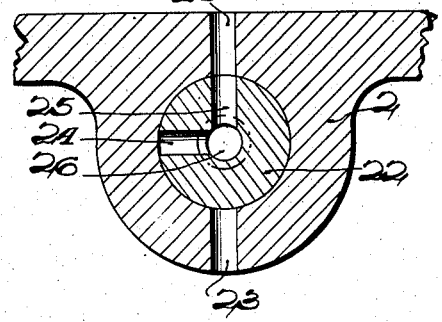
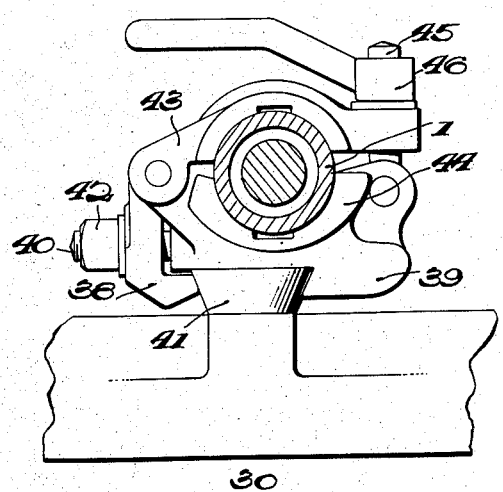

Patented Aug. 8, 1950

2,518,362

UNITED STATES PATENT OFFICE 2,518,362

STOPE DRILL COLUMN

Ralph W. Neyman, Wallace, Idaho

Application February 17, 1947, Serial No. 729,114

3 Claims. (Cl. 255—53)

This invention relates to a new and improved stope drill column or jumbo designed to facilitate the setting up, operation and removal of rock drills at the face.

The new drill jumbo permits the handling and transport by one man of a complete drilling assembly, including the column, rock drill and hose; and eliminates loss of time in transporting and setting up the drill at the face, and removing it after the rounds are drilled. In using the conventional type of jumbo or column considerable time and labor are consumed in moving the column and drill arm to the face, setting it up rigidly in position, connecting the air hose between the air supply line and drill, carrying the drill to the face and mounting it on the drill arm. This invention is designed to eliminate much of this labor.

The assembly is so designed that it may be partially collapsed for transportation or may be completely collapsed for passage through openings or raises in a tunnel where the clearance is small.

It is therefore one object of this invention to provide a complete drill column and assembly which is easily transportable by one man.

It is another object to provide such an assembly which may be readily collapsed for transportation and erected by one man in a short period of time.

It is a further object to provide such an assembly which may be easily and quickly collapsed for transportation through small spaces.

A further object is the provision of such a mobile assembly as will eliminate the necessity for a drill arm upon the column so that the drill may be directly mounted on the column. Other and further objects of the invention will become apparent as this specification proceeds.

In the accompanying drawings,

Fig. 3 is a view of the complete assembly in fully collapsed position as for passage through a confined space in a tunnel;

Fig. 4 is a top view of the assembly with the column in vertical position;

Fig. 5 is a side view, partially in section, with the drill column in fixed vertical position between the floor and ceiling of a tunnel and the drill in operating position;

Fig. 6 is a top view, partially in section, of the base and wheel assembly of the column;

Fig. 7 is a vertical sectional view of the base assembly of the column showing the valve structure, the compressed air manifold in the base of the column and the piston operating in the column;

Fig. 8 is a view partially in section of the clamping means for adjustably mounting the drill to the column; and Figs. 9 and 10 are cross sectional views showing the valve mechanism in closed and opened position.

Figure 1:
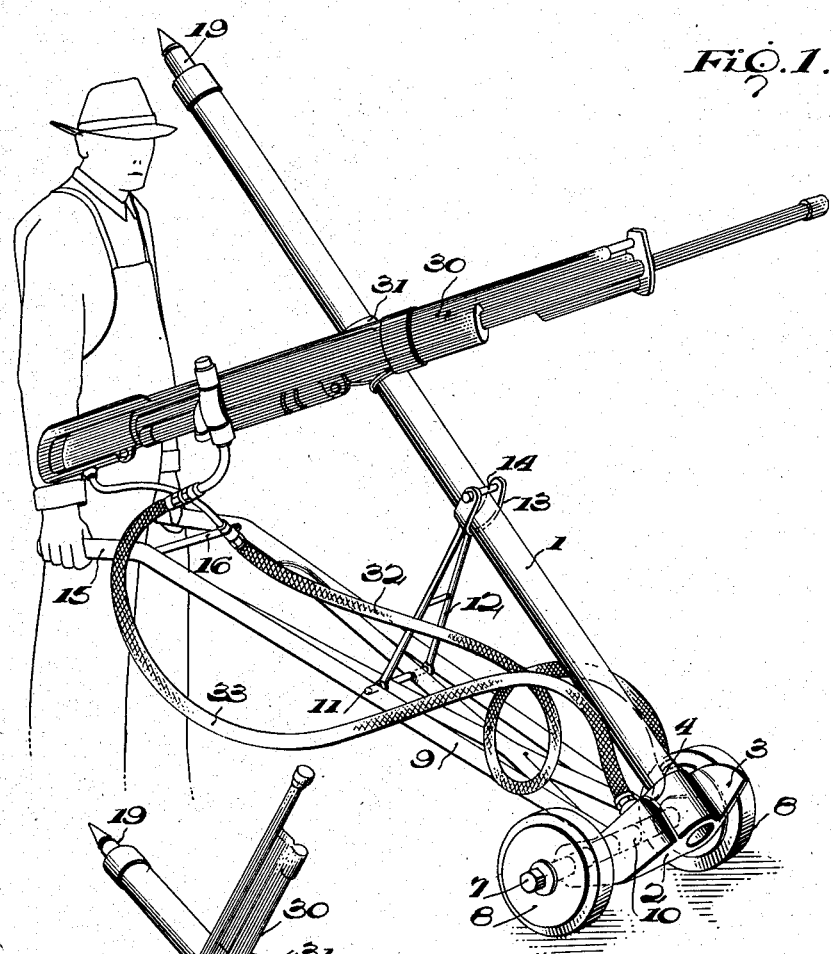
Fig. 1 is a view of the column and drill assembly in transporting position showing the column in intermediate collapsed position and a worker in transporting place at the handles.
Figure 2:
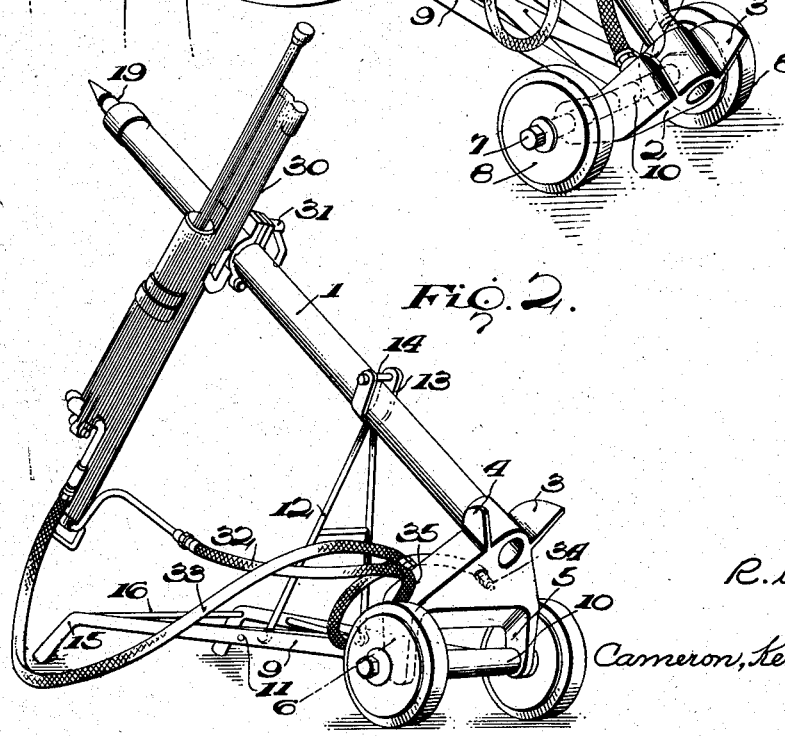
Fig. 2 is a similar showing of the assembly in a position of rest.

Referring to the drawings, wherein like reference numerals refer to like parts, cylindrical column 1, preferably formed of mild steel, is shown mounted in hollow base member 2 which is suitably recessed to receive column 1 and is preferably formed of cast steel. Base member 2 carries bracing feet 3 and 4 at its forward extremity and angularly disposed spurs 5 and 6 at its rearward extremities. Spurs 5 and 6 carry axle 7 upon which are rotatably mounted wheels 8 which are preferably rubber tired. Spurs 5 and 6 are preferably disposed to base 2 at an angle of approximately 45° in order that when the flat bottom portion of base 2 is in horizontal position on the ground, wheels 8 are swung clear of the ground, as shown in Fig. 5.

A transporting frame 9, preferably formed of light metal, carries a cylindrical sleeve 10 which fits over axle 7, between spurs 5 and 6, to allow relative angular movement between frame 9 and column 1. Frame 9 is provided with suitable cross bracing and carries a bar 11 intermediate its extremities. Pivotally mounted on bar 11 is a triangular brace 12 which is provided at its extremity with a semi-circular collar 13 designed to fit about column 1 when the assembly is in partially collapsed position for transportation. Pin 14 is provided to hold column 1 firmly in collar 13 during transportation. As shown frame 9 is turned down at its outer extremities to provide transporting handles 15, and is braced by cross bar 16.

A piston 17 is slidably mounted in column 1 and carries piston rod 18 which extends beyond the top of column 1 and terminates in pointed head 19. Cap 20 is provided over the end of column 1 and is appropriately bored to allow passage of the piston rod 18.

Base member 2, as shown, is preferably cast to provide a compressed air manifold 21 and is recessed to receive the lower extremity of column 1, which is welded or otherwise mounted therein.

Located immediately above the central portion of base manifold 21 is a cylindrical threaded plug valve 22 which communicates with the manifold through vent 23 bored in the upper wall thereof. Valve 22 carries rectangularly disposed bores 24 and 25 and axial bore 26 which latter communicates with vent 27 let into the base of column 1. Vent 28 is bored through the upper wall of base 2 to provide an outlet to the atmosphere. Valve 22 is actuated by means of handle 29 which fits over a squared stud at the end of the valve body and is screwed thereon. A 90° counterclockwise rotation of handle 29 opens communication between manifold 21 and the interior of column 1 through bores 23, 24, 26 and 27. An opposite rotation of handle 29 opens communication to the atmosphere through vent 28.

A drill 30 which may be either of the percussion or rotative type is shown mounted directly on column 1 by means of adjustable clamp 31 shown in detail in Fig. 8. Feed lines 32 and 33 communicate between manifold 21 and drill 30. They carry threaded nipples at their extremities which are screwed respectively into threaded vents 34 and 35 bored in the upper surface of base 2, communicating with manifold 21, and serve to supply the drill and blower with compressed air during operation. The main supply line 36 is screwed into vent 37 in the face of base 2 and supplies base manifold 21 with compressed air. When column 1 is placed in vertical position (Fig. 5) base 2 rests horizontally upon its flat bottom portion and upon feet 3 and 4, and wheels 8 carried by angular spurs 5 and 6 are raised above ground level. Upon opening valve 22 to communication with the base of column 1 compressed air from manifold 21 forces piston 17 upwardly in column 1 sinking pointed head 19 in the ceiling of the drift and providing a rigid column upon which drill 30 is adjustably supported.

Fig. 3 shows the assembly in completely collapsed position as for passage through confined spaces. In this position it will be noted that wheels 8 are on the ground, brace member 12 is swung down horizontally until it lies against frame 9, column 1 rests against brace 16 at the extremity of frame 9, and drill 30 is turned parallel to column 1 and lies snugly against it.

The clamp for supporting drill 30 directly on column 1 preferably comprises longitudinally adjustable jaws 38 and 39 (Fig. 8), jaw 38 being slidable upon bolt 40. Said jaws are clamped about conical stud 41 on the drill casing, by means of nut 42. Pivotally hinged jaws 43 and 44 engage about drill column 1 and are adjustable with respect thereto by means of screw threaded bolt 45 which is pivotally mounted on jaw 44 and threaded clamp 46. Drill 30 may be slid up or down on column 1 or turned to any desired position by loosening clamp 46 and jaw 43. By this means as many drillings as are desired may be made at one place.

As many vents or outlets may be bored into base 2, communicating with manifold 21, as are desired; and vent 47 is shown in Fig. 6 as an extra outlet for compressed air for any other desired source. This vent is normally plugged.

The operation of the device is as follows:

With the assembly in partially or totally collapsed position as shown in Figs. 1 and 3, the operator rolls it to the spot where drilling is to be commenced. This is particularly important in places that have no tracks. Pin 14 is removed and column 1 is then swung into vertical position until it rests on its horizontal base and on members 3 and 4. The operator then screws the threaded nipple of main feed line 36 into vent 37 communicating with the base manifold 21, supplying manifold 21 with compressed air. Valve handle 29 is then turned 90°, opening communication between base manifold 21 and the base of column 1 and allowing compressed air to pass from manifold 21 into the base of the column, forcing piston 17 upwardly and pointed head 19 into the ceiling of the drift. With column 1 in rigid vertical position, drill 30 is swung about its axis on column 1 to the desired drilling position and the drilling operation is commenced.

A number of drillings may be made at any one position. Upon completion of the drilling operation, and when it is desired to move the assembly to another location for drilling, valve handle 29 is turned 90° clockwise, opening communication between the base of the column and the atmosphere, as previously described. The release of pressure beneath piston 17 allows piston 17, piston rod 18 and head 19 to fall by gravity and the column is freed. Frame 9 is then swung upwardly until collar 13 engages column 1. Pin 14 may be put in place to hold column 1 firmly in collar 13, the operator then swings the entire assembly rearwardly onto its wheels 8 (Fig. 1), and the assembly is in position for transportation. If it becomes necessary to pass the assembly through a raise of small clearance, i. e., an opening down to 18 x 22 inches, frame 9 is lowered to the ground, bolt 14 is removed from collar 13, and brace 12 is lowered to rest against frame 9. Column 1 and drill 30 are then lowered until they rest against frame 9 and brace 16 and the entire assembly in collapsed condition is moved through the confined space. The entire assembly may be easily moved from place to place and set up for drilling by one man of average strength. The improved mounting of the drill directly on the column allows the elimination of the usual drill arm used with less mobile and heavier assemblies.

In actual trials at the same face my assembly equipped with a 3 inch, automatic percussion drill of standard type, drilled twice as many holes per shift as a 3 inch, reverse speed drill of the latest design mounted upon the conventional column. The present assembly is primarily designed for use in stopes on floors but it may also be used very effectively in tunnel work and particularly when pneumatic tires are applied to the wheels can be wheeled through a tunnel or opening without a track. This is advantageous in tunnels which are being advanced by the double drum slusher method wherein the muck is dragged back to the cars by a scraper and no track is installed within close proximity of the face.

The new assembly is easily handled by one man and greatly increases the efficiency of a drilling operation. By the old method, a number of men are required to transport, set up and operate the drill, and much valuable time is wasted in this operation. With the present assembly the entire transporting and setting up operation can be accomplished by one man, resulting in a large saving in time and labor. In addition to these advantages and due to the ease of assembly and dismantling the drilling operation is greatly expedited.

The foregoing specification is by way of illustration only, attention being directed to the appended claims for limitation of the scope of the invention.

What is claimed is:

1. In a collapsible drill assembly, a base, a pneumatic column vertically mounted on said base, a manifold in said base communicating with said column, a piston in said column, a piston rod carried by said piston and projecting beyond the end of said column in vertical position, spurs on said base angularly disposed above the bottom thereof, wheels rotatably mounted on said spurs, a drill pivotally mounted directly on said column, and a frame pivotally mounted adjacent said wheels and angularly movable with respect to said column, whereby said column and drill may be supported against said frame for transportation on said wheels.

2. In a collapsible drill assembly, a base, a column mounted on said base, a piston movable in said column, a piston rod attached to said piston and extending above said column in vertical position, a compressed air manifold in said base, valve means connecting said manifold with said column, spurs affixed to said base and angularly disposed with respect thereto, wheels rotatably mounted on said spurs, a transporting frame pivotally mounted adjacent said wheels and angularly movable with respect to said column, brace means for said column carried by said frame and angularly movable with respect thereto, whereby said base and said column may be pivoted against said brace means for transportation on said wheels.

3. In a collapsible drill assembly, a base, a cylindrical column mounted in said base, a drill pivotally mounted directly on said column, wheels rotatably mounted on said base above the lower extremity thereof, a piston within said column, a piston rod carried by said piston and extending beyond the top of said column in vertical position, vents in said base communicating with said column and said drill, valve means in said base for opening and closing the channel to said column, a frame pivotally mounted adjacent said wheels on said base, a brace for said column pivotally mounted on said frame whereby said column and drill may be collapsed against said brace for transportation on said wheels.

RALPH W. NEYMAN.

REFERENCES CITED

The following references are of record in the file of this patent:

UNITED STATES PATENTS

| Number | Name | Date |
|---|---|---|
| 268,426 | Moreau | Dec. 5, 1882 |
| 1,185,809 | Levin | June 6, 1916 |
| 1,954,957 | Smith | Apr. 17, 1934 |
| 2,168,905 | Lear | Aug. 8, 1939 |
| 2,316,672 | Curtis | Apr. 13, 1943 |

FOREIGN PATENTS

| Number | Country | Date |
|---|---|---|
| 528,566 | France | Aug. 20, 1921 |